(12) United States Patent
Sridharan et al.

(10) Patent No.: US 10,803,309 B2
(45) Date of Patent: Oct. 13, 2020

(54) IDENTIFYING VERSIONS OF A FORM

(71) Applicant: Captricity, Inc., Oakland, CA (US)

(72) Inventors: Ramesh Sridharan, Oakland, CA (US); Michail Iliadis, Oakland, CA (US); Hui Peng Hu, Berkeley, CA (US)

(73) Assignee: Captricity, Inc., Oakland, CA (US)

( * ) Notice: Subject to any disclaimer, the term of this patent is extended or adjusted under 35 U.S.C. 154(b) by 80 days.

(21) Appl. No.: 16/230,812

(22) Filed: Dec. 21, 2018

(65) Prior Publication Data

US 2019/0197304 A1 Jun. 27, 2019

Related U.S. Application Data

(60) Provisional application No. 62/610,922, filed on Dec. 27, 2017.

(51) Int. Cl.
| | |
|---|---|
| *G06K 9/34* | (2006.01) |
| *G06K 9/00* | (2006.01) |
| *G06K 9/62* | (2006.01) |
| *G06F 40/197* | (2020.01) |
| *G06F 40/174* | (2020.01) |

(52) U.S. Cl.
CPC ....... *G06K 9/00449* (2013.01); *G06F 40/197* (2020.01); *G06K 9/00483* (2013.01); *G06K 9/6202* (2013.01); *G06K 9/6215* (2013.01); *G06F 40/174* (2020.01); *G06K 2009/6213* (2013.01)

(58) Field of Classification Search
CPC ...... G06K 2209/01; G06K 9/38; G06K 9/325; G06K 9/342; G06K 9/344; G06K 9/346; G06K 9/62; G06K 9/6202; G06K 9/6288; G06K 2009/00738; G06K 9/00765; G06K 9/4604; G06K 9/6215; G06K 2009/6213; G06K 9/00483; G06K 9/6278; G06T 2207/30176; G06T 3/0093; G06T 3/40
See application file for complete search history.

(56) References Cited

U.S. PATENT DOCUMENTS

| | | | |
|---|---|---|---|
| 9,117,118 B1* | 8/2015 | Lewis | H04N 1/19594 |
| 2008/0175515 A1* | 7/2008 | Hartmann | G06T 7/246 |
| | | | 382/289 |
| 2017/0147552 A1* | 5/2017 | Carroll | G06K 9/6203 |

* cited by examiner

*Primary Examiner* — Quan M Hua
(74) *Attorney, Agent, or Firm* — Perkins Coie LLP; Brian Coleman

(57) ABSTRACT

Disclosed are a method and apparatus for determining a given variation of a form used by a filled in instance of that type of form from amongst a number of form templates. The given instance is aligned to each of the variants or form templates. The result of the alignment includes a series of key points that did not match up well ("bad" key points). The bad key points are taken from the form templates. Then, a set of pixel patches from around each of the bad key points of the form templates are extracted. The pixel patches are individually compared to corresponding pixel patches of the instance. The comparison generates a match score. The form template having the greatest match score is the correct form template.

20 Claims, 8 Drawing Sheets

SCHEDULE B (FEC Form 3)
ITEMIZED DISBURSEMENTS

Use separate schedule(s) for each category of the Detailed Summary Page

FOR LINE NUMBER: (check only one)
☐ 17  ☐ 18  ☐ 19a  ☐ 19b
☐ 20a  ☐ 20b  ☐ 20c  ☐ 21

PAGE ___ OF ___

Any information copied from such Reports and Statements may not be sold or used by any person for the purpose of soliciting contributions or for commercial purposes, other than using the name and address of any political committee to solicit contributions from such committee.

NAME OF COMMITTEE (in Full)
COMMITTEE TO ELECT CHUCK BOYCE

A. Full Name (Last, First, Middle Initial)
TRUSON MEDIA

Mailing Address: 240 E. Palmetto Ave.

City: Longwood  State: FL  Zip Code: 32750

Purpose of Disbursement: Media

Candidate Name: Henry Charles "Chuck" Boyce

Office Sought: ☐ House  ☒ Senate  ☐ President
Disbursement For: 2018  ☐ Primary  ☒ General  ☐ Other (specify)
State: DE  District: ___

Category/Type: 001

Date of Disbursement: 03 / 20 / 2017

FEC Identification Number: C_____

Amount of Each Disbursement this Period: 1,000.00

☐ Memo Item

B. Full Name (Last, First, Middle Initial)

Mailing Address

City  State  Zip Code

Purpose of Disbursement

Candidate Name

Office Sought: ☐ House ☐ Senate ☐ President
Disbursement For: 2018  ☐ Primary ☐ General ☐ Other (specify)
State:  District:

Category/Type

Date of Disbursement: __/__/____

FEC Identification Number: C_____

Amount of Each Disbursement this Period

☐ Memo Item

C. Full Name (Last, First, Middle Initial)

Mailing Address

City  State  Zip Code

Purpose of Disbursement

Candidate Name

Office Sought: ☐ House ☐ Senate ☐ President
Disbursement For: 2018  ☐ Primary ☐ General ☐ Other (specify)
State:  District:

Category/Type

Date of Disbursement: __/__/____

FEC Identification Number: C_____

Amount of Each Disbursement this Period

☐ Memo Item

SUBTOTAL of Disbursements This Page (optional) ▶  (MR)

TOTAL This Period (last page this line number only) ▶  2,484.04

IDENTIFYING VERSIONS OF A FORM

CROSS-REFERENCE TO RELATED APPLICATIONS

This application claims the benefit of U.S. Provisional Patent Application No. 62/610,922, filed Dec. 27, 2017, which is incorporated by reference herein in its entirety.

BACKGROUND

Filling out paper forms is a part of life. A trip to a doctor's office, to the department of motor vehicles (DMV), to an office of a potential new employer, etc., often involves filling out a paper form. Such forms have fields for people to provide information, such as a field for a person's name, another for his address, yet another for his phone number, etc. Some forms come in multiple versions. Each version captures nearly or completely the same information, but vary in small ways. While a human can read the multiple versions of a form (sometimes without noticing the distinctions), a computer approaches reading each version of a form differently. The lack of intuitive reading in a computer causes issues.

BRIEF DESCRIPTION OF THE DRAWINGS

One or more embodiments are illustrated by way of example in the figures of the accompanying drawings, in which like references indicate similar elements.

FIG. 1 is an instance of a filled in form.

FIG. 2 is the correct template that matches the filled in instance.

FIG. 3 is an incorrect template of a different version of the form of the filled in instance.

FIG. 4 is a side by side comparison of the correct template and the incorrect template.

FIG. 5 is an illustration of a key point analysis grid from the incorrect template.

DETAILED DESCRIPTION

Figure 6:
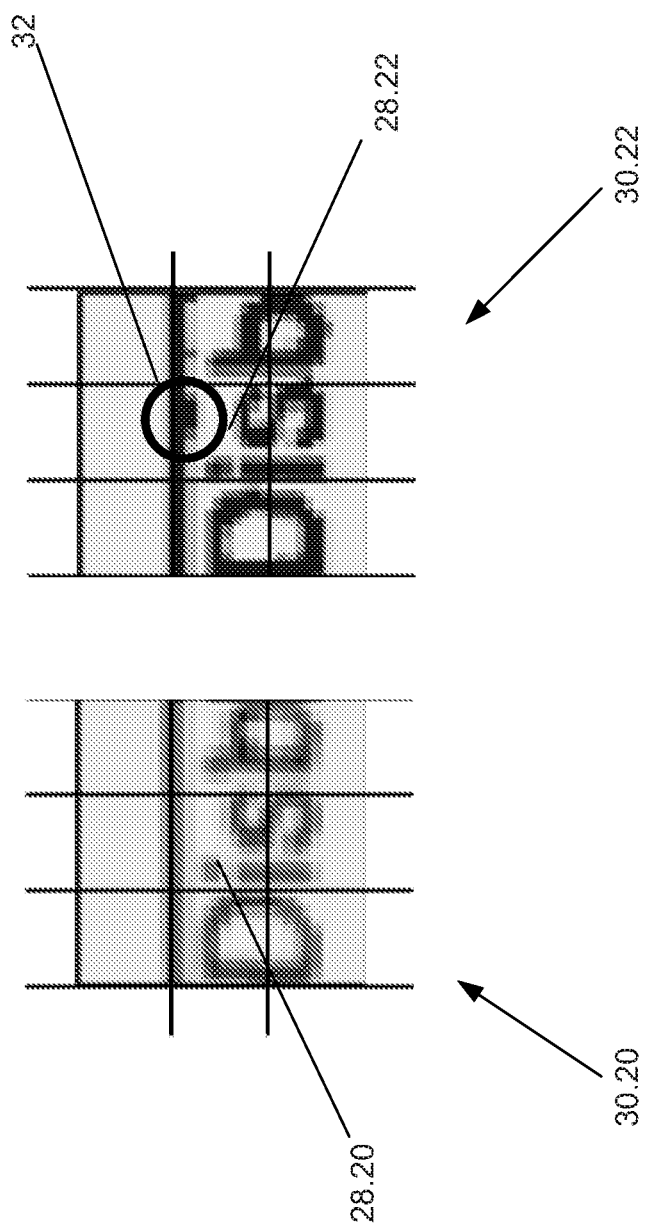
FIG. 6 is an illustration of a matching key point analysis grid.

Introduced here is technology related to automatically categorizing a filled out form into one of several available versions or templates of that form. A form is a piece of material, such as a piece of paper, plastic, fabric, cardboard, etc., on which data/information/graphics/etc. that defines the form is printed, written, etc. For example, a form can be a piece of paper on which a recorded donation for the Federal Election Commission is printed, a client intake questionnaire for a doctor's office is printed, a piece of paper on which an information data sheet for the Department of Motor Vehicles (DMV) is printed, a piece of plastic for an overhead projector on which a teacher draws a table for gathering student preferences for a field trip, a cardboard box for a cereal on which a contest entry sheet is printed, etc.

The data/information/graphics/etc. that defines a form can be applied in any of various ways to the piece of material of the form, such as by being manually written on the piece of material, by being printed on the piece of material, etc. Forms may be digitized and stored as image data on a computer. Digitized forms may have started as digital forms as generated via a word processor or a document editor, or as a physical document that was later scanned and converted to image data.

A company, office, or other organization or group may have a number of different forms. In order to automatically extract information from a particular form, such as extracting the name of a person from a filled in NAME field of a form, it may be helpful to identify a particular form template of which the particular form is an instance. In order to accomplish such an identification, it can be useful to generate a library of templates of the various different forms, and of versions of the various different form templates.

A template of a form, also referred to herein as a form template, is a version of a form that is used as a reference, such as for a comparison to an image of a selected form to determine whether the selected form is an instance of the form template, or is a different version of the form template, etc. A form template can be in any of various forms or formats from which an image of the form template can be generated. Additionally, a form template can be a source file from which an image of the form template can be generated by use of an application program that is compatible with the source file. Example formats include a BMP (Bitmap), a JPEG (Joint Photographic Expert Group) file, TIFF (Tagged Image File Format) file, etc.

A challenge arises when attempting to identify a particular form template which corresponds to an instance of a filled in form. For example, a form can have a version that varies based any of various factors, such as type of organization of fields. In order to successfully digitize data across many use cases, accurate identification of a form template, and of the version of the form template, improves efficiency of digitizing data across versions of the form.

A complete pixel comparison between the instance and the form templates will not provide the desired results because the instance of the form includes pixels where handwriting or other user input was used to fill in the form. Thus, the instance of the form will vary notably with all form templates. One could train a system on a given set of form templates (e.g., train the computer where to look for distinctions between templates); however, more effective methods are form agnostic. A form agnostic system does not have to be trained beforehand and is able to differentiate a given instance of a form between various form templates for that type of form without additional information.

Introduced here is technology that, provided a series of form templates and a filled in instance of a form, is able to identify which form template the instance matches. Identifying the form variant used by a given instance is important for efficient digitization.

In order to identify the variant used, first, the given instance is aligned to each of the variants or form templates. The result of the alignment includes a series of key points that did not match up well ("bad" key points). The bad key points are taken from the form templates. The key points taken are distinct from bad key points from the instance. Then, a set of pixel patches from around each of the bad key points of the form templates are extracted/identified. The pixel patches are compared to corresponding pixel patches of the instance. The comparison generates a match score. The form template having the greatest match score is the correct form template.

The embodiments set forth below represent the necessary information to enable those skilled in the art to practice the embodiments, and illustrate the best mode of practicing the embodiments. Upon reading the following description in light of the accompanying figures, those skilled in the art will understand the concepts of the disclosure and will recognize applications of these concepts that are not particularly addressed here. It should be understood that these concepts and applications fall within the scope of the disclosure and the accompanying claims.

The purpose of terminology used herein is only for describing embodiments and is not intended to limit the scope of the disclosure. Where context permits, words using the singular or plural form may also include the plural or singular form, respectively.

As used herein, unless specifically stated otherwise, terms such as "processing," "computing," "calculating," "determining," "displaying," "generating," or the like, refer to actions and processes of a computer or similar electronic computing device that manipulates and transforms data represented as physical (electronic) quantities within the computer's memory or registers into other data similarly represented as physical quantities within the computer's memory, registers, or other such storage medium, transmission, or display devices.

As used herein, terms such as "cause" and variations thereof refer to either direct causation or indirect causation. For example, a computer system can "cause" an action by sending a message to a second computer system that commands, requests, or prompts the second computer system to perform the action. Any number of intermediary devices may examine and/or relay the message during this process. In this regard, a device can "cause" an action even though it may not be known to the device whether the action will ultimately be executed.

FIG. 1 is an instance 20 of a filled in form. The form displayed here is one provided by the Federal Election Commission to record itemized disbursements. The specific form is provided as an example due to the public nature of the information written thereon. Despite use of the referenced example, the system is able to process any type of form provided. During the process described herein, the instance 20, or portions thereof, are compared to form templates.

Figure 2:
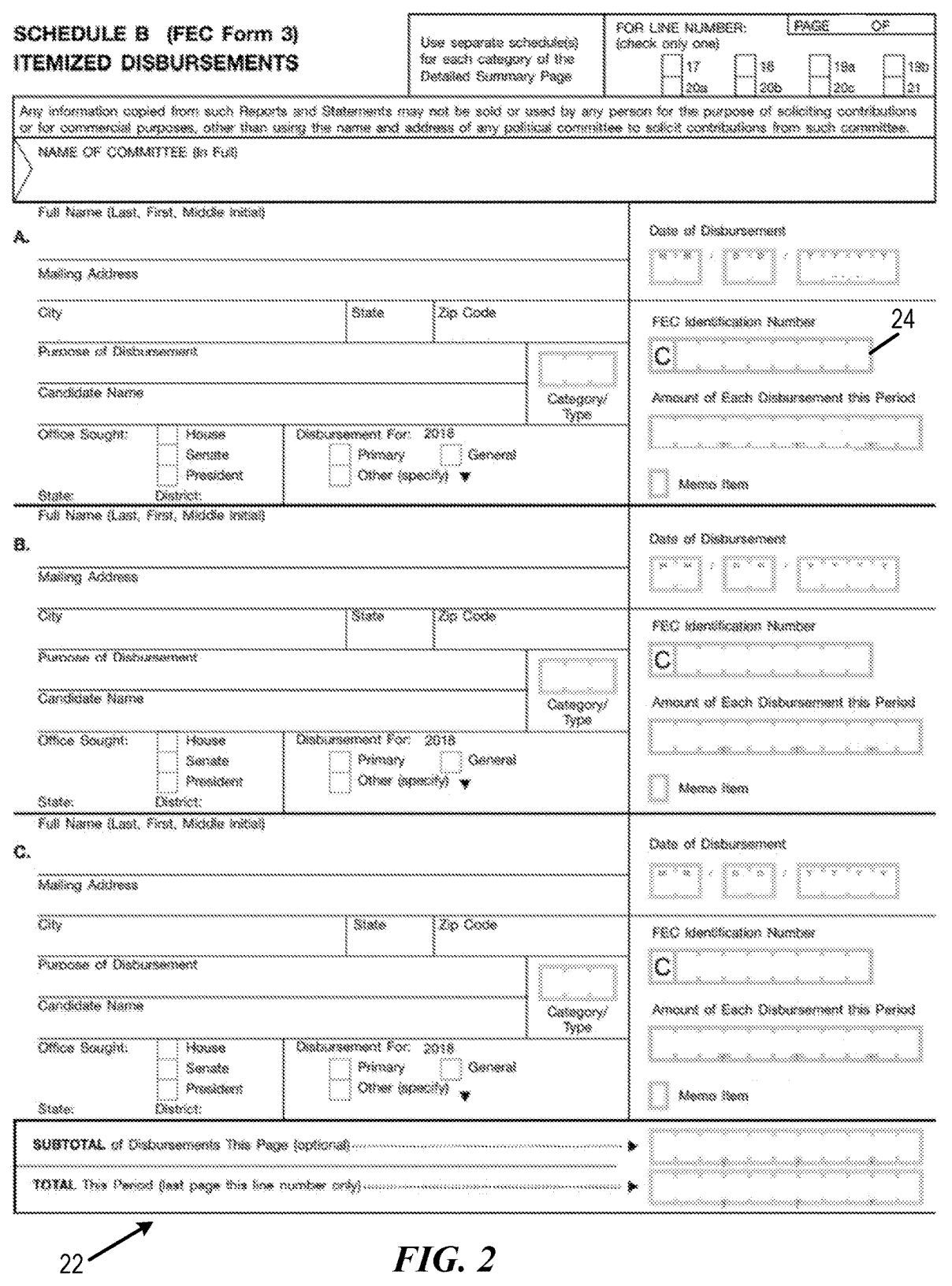

FIG. 2 is the correct template 22 that matches the filled in instance 20. Notably, the pictured form template is blank. The correct template 22 is the form template that has all the matching fields of the instance 20. The correct template 22 is the form upon which the instance 20 was filled out.

The correct template 22, and other form templates included herein, include a number of suggested field locations 24 that do not appear on the printed and scanned copy of the instance 20. The suggested field locations 24 are artifacts of a digitized form and do not exist on a printed, physical form.

In some embodiments of the technique disclosed herein, these suggested field locations 24 are not included in the form templates. However, the technique will function with or without the suggested field locations 24. Accuracy is improved where all form templates are consistent concerning the inclusion of digital artifacts such as the suggested field locations 24. One method of removing the suggested field locations 24 is merely to print out the form template and scan. The scanned in version will not include the suggested field locations 26.

Figure 3:
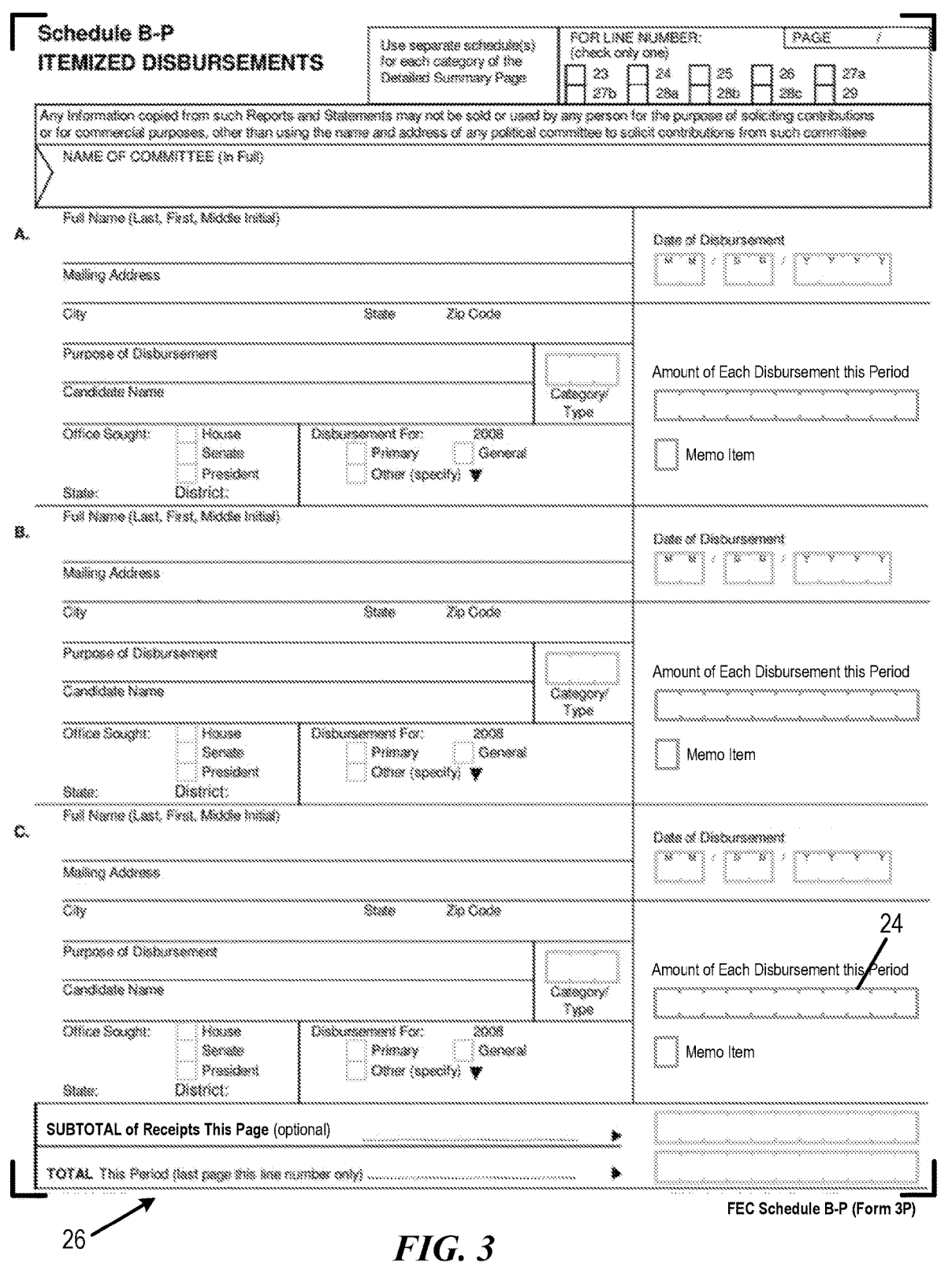

FIG. 3 is an incorrect template 26 of a different version of the form of the filled in instance 20. The pictured form is also blank. The incorrect template 26 includes meaningfully similar fields and a human would fill in nearly identical information between the form templates 22, 26. However, the incorrect template 26 has fewer fields, and fields in different locations as opposed to the correct template 22.

The variations are problematic from a computer vision standpoint. A human can intuitively read the form without having to perform any special analysis. Conversely, where the computer knows how to process instances 20 of a particular type of form, different versions of that form require different processing techniques. The problem is a result of the important information of the form needing to be extracted from different locations on the form based on what variant was used in the instance 20.

For example, take the handwritten data "1,000.00" referring to the "Amount of Each Disbursement this Period" on the instance 20. If the system processes a given instance 20 according to the correct template 22, the system knows what portion of the form to extract in order to obtain the image data including the handwritten $1000. Conversely, if the system processes the instance 20 according to the wrong template 26, the image data extracted instead covers the field title that states "Amount of Each Disbursement the Period" in print. Extracting the image data does not capture the user input.

FIGS. 1 to 3 show a combination of physical and digital forms. Combining the forms is not a requirement. Specifically, FIG. 1 is a scanned version of a physical form including handwriting. While the pictured result is a common occurrence, it is not the only type of occurrence. Some forms are never made physical. In some circumstances, metadata attached to the digitized form may identify the form variant and negate the necessity of the technique taught herein; however, forms are not always identified via metadata. Some digitized forms are poorly organized and do not have identifying metadata. Regardless of the life cycle of a given instance of a form, so long as the pixels making up the image data of the form may be analyzed, the technique taught herein is effective.

Figure 4:
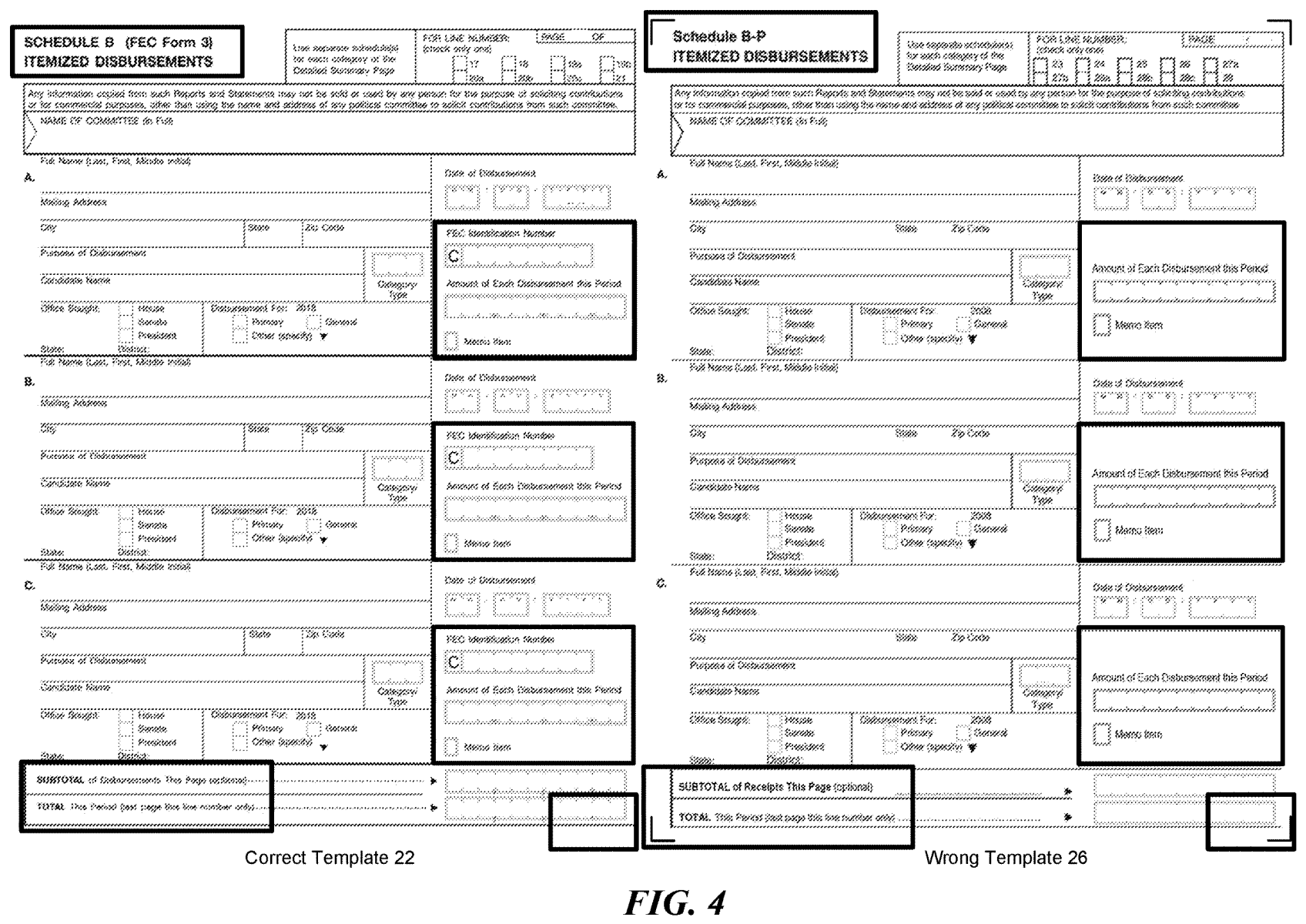

FIG. 4 is a side by side comparison of the correct template 22 and the incorrect template 26. For illustrative purposes, certain sections of the correct template 22 and the wrong template 26 have been highlighted. The highlighted sections illustrate some of the distinctions between the two form templates 22, 26. There are actually more distinctions; however, those highlighted are significant enough to illustrate the importance of processing an instance based on the correct form template.

Figure 5:
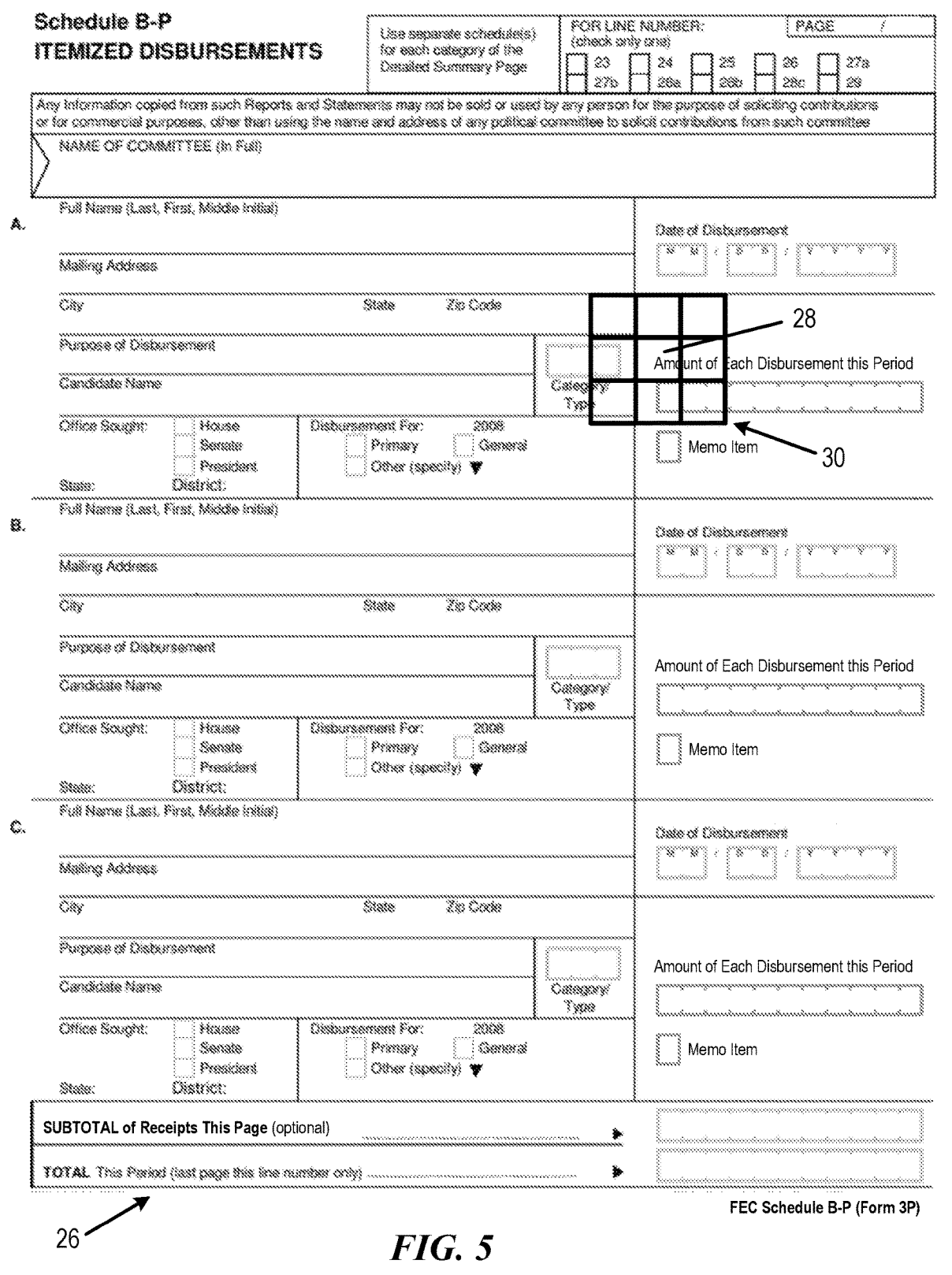

FIG. 5 is an illustration of a key point analysis grid from the incorrect template 26. FIG. 5 is a simple illustration of what the system does to figure out which form template is the correct one. The figure includes the wrong template 26 and highlights a poorly matching key point 28 or a bad key point 28, as well as a grid of pixel patches 30 proximate to the bad key point 28.

To make the ultimate determination of template, the pictured grid and many other grids of pixel patches 30 are compared between the form templates are corresponding pixel patches on the instance 20. The closest match across the comparisons indicates the correct form template.

In order to perform the above, the system determines the bad key points 28 and pixel patches 30 to compare. "Bad" key points are the output of a registration/alignment algorithm. In accordance with embodiments of the disclosed method, the instance 20 is aligned to each of the form templates individually. Some pixels will not match well. These are the bad key points. There are bad key points from both the instance 20 and the form template. The bad key points that are the used are those from the form templates. "bad" key points of the form templates are used because the bad key points from the instance 20 will include the handwriting/user input. The user input will not match well to any of the form templates (each form template is blank).

Even the correct template 22 will have bad key points 28. The cause of bay key points on the correct template 22 is small variations in the registration, printing errors, scanning errors, human error, or any assortment of other possible errors. These are generally nominal errors, and ultimately, the disclosed method identifies between an error and an omission/addition (caused by the incorrect form).

Given one or more bad key points 28, the system extracts a number of pixel patches proximate the bad key points 28. FIG. 5 particularly displays a grid of pixel patches 30. The grid has nine pixel patches, though other numbers are suitable. Each of the pixel patches is compared to the corresponding pixel patches of the instance 20. The comparison is done a number of times for each bad key point 28 and associated grid of pixel patches 30. The comparison then outputs a matching score. The highest matching score indicates the correct form template.

In the example shown in FIG. 5, the bad key point 28 is a portion of the word "Amount". Comparatively, the same pixels on the instance 20 include a large letter "C" that goes in front of the user's FEC Identification number. As a result that the word "Amount" does not register well with a big "C", the method will identify a bad key point 28 for the pictured form template.

Further, a comparison of the bad key point 28 and surrounding pixel patches 30 includes numerous inconsistencies. These inconsistencies lead to a poor matching score. The matching score for the comparison combined with the matching score for other bad key points indicate that the form template shown in FIG. 5 is, in fact, the wrong template 26. In contrast, the correct template 22 does not have the same level of inconsistencies.

FIG. 6 is an illustration of a matching key point analysis grid. In practice, the grid of pixel patches 30 drawn on FIG. 5 is larger than ideal. The size is for illustrative purposes. Using a smaller grid helps avoid handwriting/user input. If a pixel patch catches handwriting, the comparison for that pixel patch is thrown off. The grids displayed in FIG. 6 are 32×32 pixels. 32 pixels does not divide evenly into 3 patches. It is unnecessary for a given pixel patch to include complete pixels, or that a given pixel patch have a uniform size.

The left grid of pixel patches 30.20 is from the instance 20, and the right grid of pixel patches 30.22 is from the correct template 22. The bad key point 28.22 is the first four letters of the word "Disbursement" and could be from a number of locations on the correct template 22 (e.g., look at the bottom right of the A., B., and C. blocks).

The bad key point 28.22 was identified in the registration process based on a few erroneous pixels 32. There are many causes for why the erroneous pixels 32 are there. However, on analysis of the remaining eight pixel patches, there is a strong matching correlation. As a result, bad key point 28.22 is categorized as an error/noise as opposed to a distinction between forms.

Figure 7:
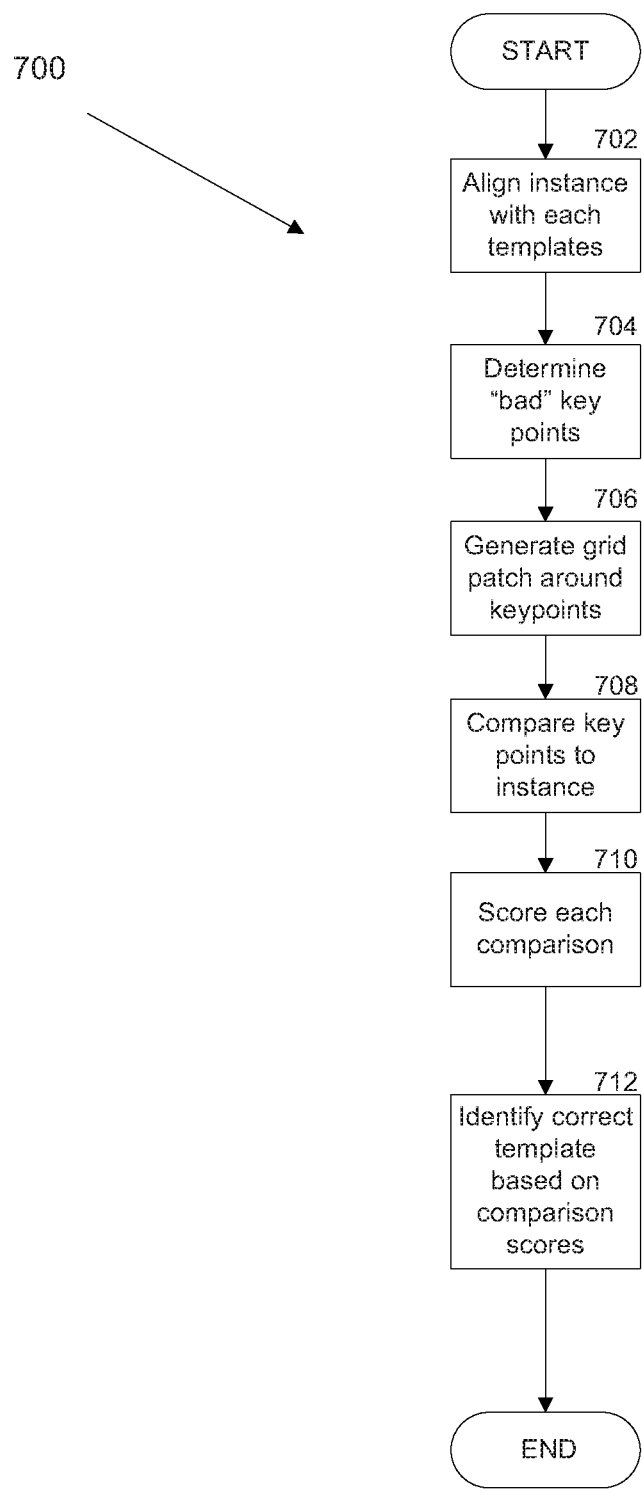
FIG. 7 is a flowchart illustrating a method of determining which version of a form a particular instance is.

FIG. 7 is a flowchart illustrating a method of determining which version of a form a particular instance is. In step 702, an instance of a form is aligned/registered with each form template. The alignment is performed individually for each form template and there is a different result for each. There are a number of registration techniques that are suitable. In some embodiments, based on a threshold of movement in the alignment/registration process, alignment may be performed twice on a given instance/template pairing. For example, where an instance is rotated more than 90 degrees in order to align, the alignment may be performed a second time on the once-aligned instance. The registration process used outputs key points that did not register well as a byproduct. An example of such a registration process is available via OpenCV. OpenCV is a public library available through Opencv.org. A capture on Dec. 2, 2017 of OpenCV is available through the Internet Archive at https://web.archive.org/web/20171202174943/https://opencv.org/. Specifically, OpenCv has a function called SURF key points that provides the bad key points.

In step 704, the system determines the bad key points to use. As noted in step 702, the registration technique outputs the requisite bad key points. The bad key points used in subsequent steps are from the registration of the form template as opposed to the instance. Points from the template are carried forward because the bad key points from the instance will include the handwriting/user input. The user input will not match well to any of the form templates (each form template is blank).

The purpose of the process is to determine which form template is correct. If the handwriting does not register well to any of the form templates, it is not as useful to determining the correct form template. The above is not to say that the bad key points from the instance are never useful. A comparison using bad key points from the instance can still be made.

In step 706, the system extracts pixels proximate to the bad key point from both the form template, and the instance registered to the form template. The pixels can take a number of shapes and be subdivided a number of ways. Pictured in FIGS. 5 and 6 are 3×3 grids. In other embodiments, other shapes, such as circles or triangles, could be used for both individual cells and/or the entire set of analyzed pixels. A set of pixels that include the bad key point, and adjacent pixels are used. The set of pixels may be subdivided into cells and there may be multiple layers of adjacency to the bad key point, or a single layer. There may be incomplete layers of adjacency (e.g., the bad key point plus a cell to the left side, and no other cells).

In step 708, the set of pixels from the form template are compared to the corresponding pixels of the instance registered to the form template. Like the method of registration/alignment, the method of comparison may vary. A goal of the process is to determine how well each cell matches its corresponding cell. An example method of comparison uses a histogram of oriented gradients (HOG). Pixels from each cell are compared and a Euclidean distance between the cells provides a match score.

In step 710, the individual form templates match scores are determined. As a result that there are multiple bad key points that are individually analyzed, there is an overall form template match score. The overall form template match score is based on a combination the individual match scores from each of the pixel patches. In some embodiments, the individual patches are blurred before a comparison technique is used. The comparison technique can be taken a number of ways. Examples of overall match score techniques include averages, summations, averages while discarding outliers, and averages of select bad key points having the poorest individual match scores. In step 712, the correct form template is chosen. The correct template is the form template having the best overall match score with its respective registered instance.

Figure 8:
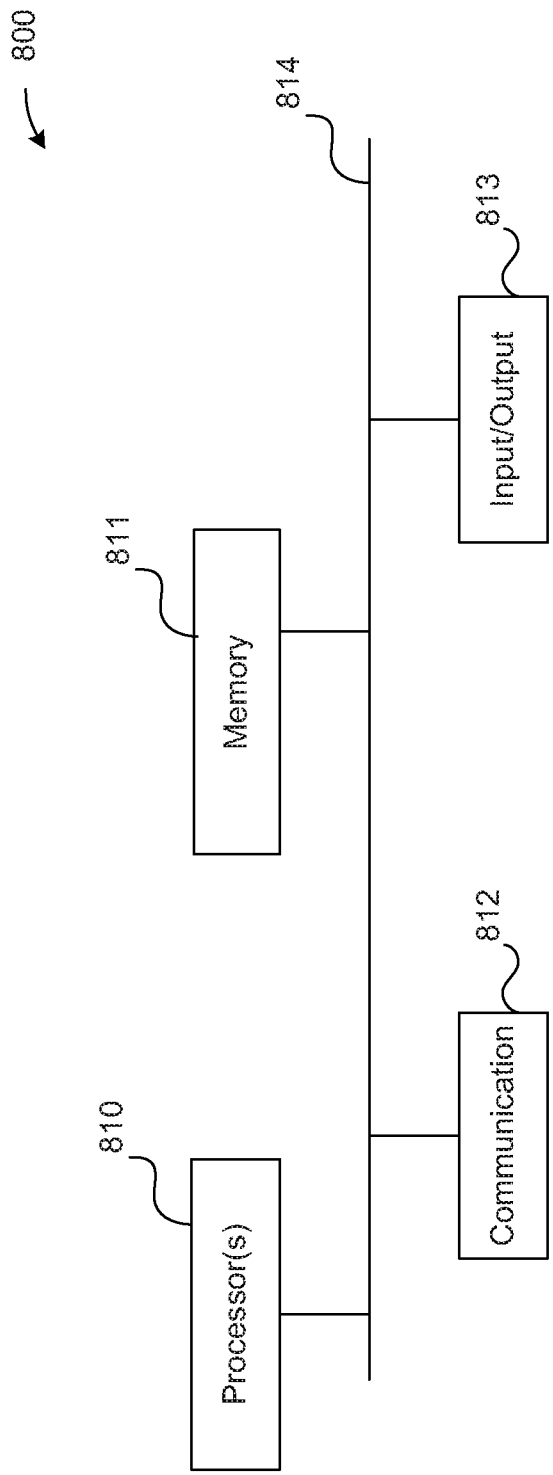
FIG. 8 is a high-level block diagram showing an example of a processing device.

FIG. 8 is a high-level block diagram showing an example of a processing device 800 that can represent a system to run any of the methods/algorithms described above. A system may include two or more processing devices such as represented in FIG. 8, which may be coupled to each other via a network or multiple networks. A network can be referred to as a communication network.

In the illustrated embodiment, the processing device 800 includes one or more processors 810, memory 811, a communication device 812, and one or more input/output (I/O) devices 813, all coupled to each other through an interconnect 814. The interconnect 814 may be or include one or more conductive traces, buses, point-to-point connections, controllers, scanners, adapters and/or other conventional connection devices. Each processor 810 may be or include, for example, one or more general-purpose programmable microprocessors or microprocessor cores, microcontrollers, application specific integrated circuits (ASICs), programmable gate arrays, or the like, or a combination of such devices. The processor(s) 810 control the overall operation of the processing device 800. Memory 811 may be or include one or more physical storage devices, which may be in the form of random access memory (RAM), read-only memory (ROM) (which may be erasable and programmable), flash memory, miniature hard disk drive, or other suitable type of storage device, or a combination of such devices. Memory 811 may store data and instructions that configure the processor(s) 810 to execute operations in accordance with the techniques described above. The communication device 812 may be or include, for example, an Ethernet adapter, cable modem, Wi-Fi adapter, cellular transceiver, Bluetooth transceiver, or the like, or a combination thereof. Depending on the specific nature and purpose of the processing device 800, the I/O devices 813 can include devices such as a display (which may be a touch screen display), audio speaker, keyboard, mouse or other pointing device, microphone, camera, etc.

Unless contrary to physical possibility, it is envisioned that (i) the methods/steps described above may be performed in any sequence and/or in any combination, and that (ii) the components of respective embodiments may be combined in any manner.

The techniques introduced above can be implemented by programmable circuitry programmed/configured by software and/or firmware, or entirely by special-purpose circuitry, or by a combination of such forms. Such special-purpose circuitry (if any) can be in the form of, for example, one or more application-specific integrated circuits (ASICs), programmable logic devices (PLDs), field-programmable gate arrays (FPGAs), etc.

Software or firmware to implement the techniques introduced here may be stored on a machine-readable storage medium and may be executed by one or more general-purpose or special-purpose programmable microprocessors. A "machine-readable medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc.

Physical and functional components (e.g., devices, engines, modules, and data repositories, etc.) associated with processing device 1000 can be implemented as circuitry, firmware, software, other executable instructions, or any combination thereof. For example, the functional components can be implemented in the form of special-purpose circuitry, in the form of one or more appropriately programmed processors, a single board chip, a field programmable gate array, a general-purpose computing device configured by executable instructions, a virtual machine configured by executable instructions, a cloud computing environment configured by executable instructions, or any combination thereof. For example, the functional components described can be implemented as instructions on a tangible storage memory capable of being executed by a processor or other integrated circuit chip (e.g., software, software libraries, application program interfaces, etc.). The tangible storage memory can be computer readable data storage. The tangible storage memory may be volatile or non-volatile memory. In some embodiments, the volatile memory may be considered "non-transitory" in the sense that it is not a transitory signal. Memory space and storages described in the figures can be implemented with the tangible storage memory as well, including volatile or non-volatile memory.

Note that any and all of the embodiments described above can be combined with each other, except to the extent that it may be stated otherwise above or to the extent that any such embodiments might be mutually exclusive in function and/or structure.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

The invention claimed is:

1. A method for identifying a version of a form from a filled-in instance of a form, the method comprising:
    aligning the filled-in instance to a first template form;
    based on the result of the aligning, receiving a first unmatched key point on the first template form;
    comparing pixel patches surrounding the first unmatched key point of the first template to a set of corresponding pixels on the filled-in instance; and
    based on the comparing, determining a first match score for the first template to the filled-in instance.

2. The method of claim 1, further comprising:
    aligning the filled in instance to a second template form;
    based on the result of the aligning of the second template, receiving a second poorly matched key point on the second template;
    comparing a second set of corresponding pixels patches of the second template to the filled-in instance, the second set of corresponding pixel patches proximate to the second poorly matched key point; and
    based on the comparing, determining a second match score for the second template to the filled in instance.

3. The method of claim 2, further comprising:
    comparing the first match score and second match score of the first and second templates; and
    determining a form version for the filled in instance based on the comparison of the match scores.

4. The method of claim 1, wherein said aligning further comprises:
    determining that a first alignment process of the filled-in instance and the first template form has exceeded a threshold shift;
    executing a second alignment process between the filled-in instance and the first template form.

5. The method of claim 1, further comprising:
before said comparing, blurring the pixel patches.

6. The method of claim 1, wherein said comparing further includes:
calculating a Euclidean distance between each pixel patch and the set of corresponding pixels on the filled-in instance.

7. The method of claim 6, wherein said determining the first match score further comprises:
identifying an average Euclidean distance across each pixel patch.

8. The method of claim 1, wherein the pixel patches comprise a first patch including the first unmatched key point and a second patch adjacent to the first patch.

9. The method of claim 8, wherein the pixel patches are organized into 3×3 grids and the first patch is a center pixel patch.

10. A method comprising:
comparing a first set of pixels of a filled in document to a second set of pixels of a first template document;
identifying from the second set of pixels, a subset of pixels that did not match corresponding pixels of the first set of pixels based on said comparing;
generating pixel patches from the subset of pixels wherein the pixel patches are patches of pixels adjacent to each pixel of the subset of pixels; and
calculating a first match score between the pixel patches and corresponding patches of the filled in document.

11. The method of claim 10, further comprising:
comparing the first set of pixels of the filled in document to a third set of pixels of a second template document;
identifying from the third set of pixels, an additional subset of pixels that did not match corresponding pixels of the first set of pixels based on said comparing;
generating additional pixel patches from the additional subset of pixels wherein the additional pixel patches are patches of pixels adjacent to each pixel of the additional subset of pixels;
calculating a second match score between the additional pixel patches and additional corresponding patches of the filled in document; and
determining that the filled in document is associated with either the first template document or the second template document based on the highest of the first match score and the second match score.

12. The method of claim 10, wherein the pixel patches comprise a first patch including the at least one pixel of the subset of pixels and a second patch adjacent to the first patch.

13. The method of claim 10, wherein said calculating further includes:
calculating a Euclidean distance between each pixel patch and each of the corresponding patches of the filled in document.

14. The method of claim 13, wherein said determining the first match score further comprises:
identifying an average Euclidean distance across each pixel patch.

15. A system comprising:
a memory including a plurality of template forms and a form instance; and
a processor configured to align the form instance to each of the plurality of template forms and compare patches of pixels surrounding one or more unmatched key points from each of the plurality of template forms to corresponding pixels of the form instance, wherein the processor is further configured to determine a matching template form to the form instance based on a highest matching comparison between the patches of pixels surrounding the one or more unmatched key points of a given template form of the plurality of template forms to the corresponding pixels of the form instance.

16. The system of claim 15, wherein the processor is further configured while aligning to determine that a first alignment process of between the form instance and the given template form has exceeded a threshold shift and execute a second alignment process between the instance form and the given template form.

17. The system of claim 15, wherein the processor is further configured to blur the patches of pixels prior to comparing to corresponding pixels of the form instance.

18. The system of claim 15, wherein the comparison between the patches of pixels and the corresponding pixels of the form instance further includes identification of a Euclidean distance between each patch of pixels and the corresponding pixels of the form instance.

19. The system of claim 18, wherein the processor is further configured to average the Euclidean distance across each pixel patch to determine the highest matching comparison.

20. The system of claim 15, wherein the unmatched key points are an output of the alignment of the form instance and each of the plurality of template forms.

* * * * *